United States Patent
Shibano

[11] Patent Number: 6,072,531
[45] Date of Patent: Jun. 6, 2000

[54] SCANNING SYSTEM CONVERTING INTO PROGRESSIVE SCANNING SYSTEM REGARDLESS OF SCANNING SYSTEM BEFORE CODING

[75] Inventor: Motoyoshi Shibano, Tokyo, Japan

[73] Assignee: NEC Corporation, Tokyo, Japan

[21] Appl. No.: 09/185,710

[22] Filed: Nov. 4, 1998

[30] Foreign Application Priority Data

Nov. 21, 1997 [JP] Japan ................................ 9-321597

[51] Int. Cl.[7] .................................................. H04N 7/01
[52] U.S. Cl. ........................................ 348/448; 348/452
[58] Field of Search .................................. 348/448, 452, 348/458, 441, 699, 200, 558

[56] References Cited

U.S. PATENT DOCUMENTS

| | | | |
|---|---|---|---|
| 5,365,273 | 11/1994 | Correa et al. | 348/452 |
| 5,532,751 | 7/1996 | Lui | 348/452 |
| 5,689,301 | 11/1997 | Christopher et al. | 348/97 |
| 5,754,248 | 5/1998 | Faroudjon | 348/474 |

FOREIGN PATENT DOCUMENTS

| | | |
|---|---|---|
| 8-125976 | 5/1976 | Japan . |
| 4-79685 | 3/1992 | Japan . |
| 7-99603 | 4/1995 | Japan . |
| 8-130716 | 5/1996 | Japan . |
| 8-251504 | 9/1996 | Japan . |
| 9-182032 | 7/1997 | Japan . |
| 9-182111 | 7/1997 | Japan . |
| 11-41606 | 2/1999 | Japan . |

OTHER PUBLICATIONS

Japanese Office Action, dated Oct. 12, 1999, with English Langauge Translation of Japanese Examiner's comments.
Yasuada, K., "International Standard of MPEG/Multimedia Labeling,"1st Edition, Maruzen; Sept. 30, 1994, pp. 35–57.

*Primary Examiner*—Victor R. Kostak
*Attorney, Agent, or Firm*—Whitham, Curtis & Whitham

[57] ABSTRACT

In a scanning system converting system for a display unit, a decoder decodes a coded image data to output a decoded image data and a control data. The coded image data is obtained by coding a first image data, and the control data indicates whether a scanning system of the first image data is a progressive scanning system or an interlace scanning system and whether fields of the first image data are correlated. A control section selectively generates the effective indication signal and first and second control signals based on the control data supplied from the decoder. A converting section selectively outputs, as a second image data, one of a current field of the decoded image data, a previous field of the decoded image data and an interpolated image data for every line based on the first and second control signals supplied from the control section. The interpolated image data is interpolated from the current field of the decoded image data for a current line and at least one line associated with the current line. A transfer section transfers the second image data to the display unit in response to the effective indication signal.

21 Claims, 9 Drawing Sheets

SCANNING SYSTEM CONVERTING INTO PROGRESSIVE SCANNING SYSTEM REGARDLESS OF SCANNING SYSTEM BEFORE CODING

BACKGROUND OF THE INVENTION

1. Field of the Invention

The present invention relates to a scanning system converting apparatus and a method for the same, and more particularly to the technique in which a scanning system is converted from an interlace scanning system into a progressive scanning system when an image data which is coded by a coding system such as the MPEG2 (Moving Picture Expert Group 2) is decoded.

2. Description of the Related Art

As an image data which can be coded in accordance with MPEG2, there are an image data which is coded by an interlace scanning system which is used in monitors such as an NTSC TV monitor and an image data which is coded by a progressive scanning system which is used in monitors such as a monitor of a personal computer. When an image data coded in accordance with the MPEG2 is received through a communication line, a decoded image data must be outputted to the NTSC TV monitor in the interlace scanning system.

However, it is often requested that the image data is outputted in the interlace scanning system and, at the same time, is outputted to a monitor of the progressive scanning system such as the monitor of the personal computer. In such a case, it is necessary for a scanning system converting apparatus to convert the scanning system of the image data outputted from the interlace scanning system into the progressive scanning system.

However, conventionally, when the image data of a progressive scanning system originally is coded in accordance with the MPEG2, there is a problem in that the image quality is degraded, when the scanning system of the decoded image data is converted into the progressive scanning system by the scanning system converting apparatus, compared with the image quality before coding.

In the image signal of the interlace scanning system, the sampling position of the image data is shifted between a previous field and the current field in a vertical direction, as shown in relation of frame period and vertical axis of FIG. 1. Thus, it is necessary to determine whether or not there is a change in the images between the fields, when the scanning system of the image data is converted from the interlace scanning system into the progressive scanning system. For this determination, there is a method of calculating a difference between a signal interpolated from the upper line and the lower line and a signal in the previous field, as shown in FIG. 1. However, in this method, there is a case where the signal which is obtained by the interpolation greatly differs from an actual signal in the region with a high vertical resolution.

Also, as shown in FIG. 2, there is a method of determining a signal difference between the frames. However, when the image changes at a frequency which is higher than 30 Hz, the change can not be detected. Therefore, the image data whose scanning system is to be converted into the progressive scanning system is not identical with the image data before coding with any of the above methods.

Also, in the case contrary to the above, that is, when the image data of the interlace scanning system is coded in accordance with the MPEG2, the decoded image data is outputted in accordance with the progressive scanning system, and further the scanning system of the decoded image data is converted from the progressive scanning system into the interlace scanning system, there is a problem in that the image quality is degraded compared with the image quality before coding, as described above.

In addition, a video signal processing method is described in Japanese Laid Open Patent Application (JP-A-Heisei 9-182111). In this reference, an interlace component signal of 270 MHz in a (4:2:2) signal format is inputted to the video processing circuit from an input terminal 1, and converted into a 10-bit signal of 27 MHz in parallel in the processing circuit. Also, first and second blocks of a progressive component signal are inputted from the input terminals 1 and 2. An interpolating operation is performed to the color components of the first and second signal blocks so as to generate a serial signal of 360 MHz in a (4:2:2:4) signal format. Then, the serial signal is converted into a 10-bit parallel signal of 36 MHz. Finally, these component signals are re-converted into the signal formats in the input.

Also, a video display system is described in Japanese Laid Open Patent Application (JP-A-Heisei 8-251504). In this reference, a video signal is received in a switch 106. A user can select, by the switch 106, at least one of auxiliary channel by which a main channel image and a special function image can be viewed, when he does not want to view the main channel image for the special function image. A main video channel data is converted in scanning system from an interlace scanning system into a progressive scanning system by a scanning system converter 216. A logic unit 212 processes an auxiliary channel data to format into a selected special function. The data is inputted into the scanning converter 216 and the special function image is displayed at a proper position to the main channel image.

Also, a TV signal transmission apparatus is described in Japanese Laid Open Patent Application (JP-A-Heisei 4-79685). In this reference, the TV signal transmission apparatus is composed of a first motion detecting section for detecting a motion in a frame of an image data of a progressive scanning system and a second motion detecting section for detecting a motion between frames of an image data of an interlace scanning system. When any motion is detected by the first motion detecting section and any motion is not detected by the second motion detection section, a fixed value is added to a transmission signal so that the motion can be detected based on the fixed value.

SUMMARY OF THE INVENTION

The present invention is accomplished to solve the above problems in the conventional examples. Therefore, an object of the present invention is to provide a scanning system converting apparatus and a method for the same, in which the image quality of an image after conversion is not degraded, compared with the image quality of an original image, when a scanning system of an image data is converted from an interlace scanning system into a progressive scanning system.

In order to achieve an aspect of the present invention, a scanning system converting system for a display unit of a progressive scanning system includes a decoder for decoding a coded image data to output a decoded image data and a control data, wherein the coded image data is obtained by coding a first image data, and the control data indicates whether a scanning system of the first image data is a progressive scanning system or an interlace scanning system and whether fields of the first image data are correlated. A control section selectively generates an effective indication signal and first and second control signals based on the control data supplied from the decoder. A converting section selectively outputs, as a second image data, one of a current field of the decoded image data, a previous field of the decoded image data and an interpolated image data for every line based on the first and second control signals supplied from the control section, the interpolated image data being interpolated from the current field of the decoded image data. A transfer section transfers the second image data to the display unit in response to the effective indication signal.

The converting section may include a field memory for storing the previous field of the decoded image data outputted from the decoder to output the previous field of the decoded image data for every line as a first line image data; a first line memory for storing the current field of the decoded image data outputted from the decoder for every line to output the current field of the decoded image data for every line as a second line image data; a first switch for selecting one of the first line image data and the second line image data in response to a first switching signal to output the selected image data as a third line image data; an interpolating section for generating the interpolated image data for every line from the current field of the decoded image data and the second line image data outputted from the first line memory to output a third line image data; a detecting section for detecting a difference between the first line image data and the third line image data in response to the first control signal to output the first switching signal to the first switch based on the detecting result; a third line memory for storing the third line image data to output as a fourth line image data; a fourth line memory for storing the current field of the decoded image data outputted from the decoder for every line to output as a fifth line image data; and a second switch for selecting one of the fourth line image data and the fifth line image data in response to the second control signal as a second switching signal to output the selected image data as the second image data.

In this case, the control section may generate the second control signal as the second switching signal such that the fourth line image data and the fifth line image data are alternately outputted to the transfer section as the second image data.

Also, the control section may generate the first control signal such that the first line image data is always selected when the first image data is of a progressive scanning system.

Further, the detecting section outputs the first switching signal to the first switch in response to the first control signal such that the first line image data is always selected, when the first image data is of a progressive scanning system. In this case, the detecting section may output the first switching signal to the first switch based on the detecting result in response to the first control signal such that one of the first line image data and the second line image data is selected, when the first image data is of an interlace scanning system. The detecting section outputs the first switching signal to the first switch in response to the first control signal such that the first line image data is selected, when the first image data is of an interlace scanning system and when the difference is smaller than a predetermined value, and such that the second line image data is selected, when the first image data is of an interlace scanning system and when the difference is equal to or larger than the predetermined value.

In addition, the control section outputs the effective indication signal such that the effective indication signal is always active when the first image data is of an interlace scanning system, and such that the effective indication signal is active only for a first one of fields of a frame of the second image data when the first image data is of a progressive scanning system.

In the above, the coded image data is desirably obtained by coding the first image data based on a MPEG2, and the decoder desirably decodes the coded image data based on the MPEG2.

In order to achieve another aspect of the present invention, a method of converting a scanning system of an image data signal into a progressive scanning system, includes the steps of:

decoding a coded image data obtained by coding an original image data to generate a decoded image data and a control data;

outputting a previous field of the decoded image data for a current line as a first line image data;

outputting, as a second line image data, an interpolated image data obtained from the current field of the decoded image data for the current line and at least one line associated with the current line;

outputting, as a third line image data, the second image data when a difference between the first line image data and the second line image data is equal to or larger than a predetermined value and when the original image data is of an interlace scanning system;

outputting the current field of the decoded image data for the current line as a fourth line image data;

alternately outputting, as a fifth line image data, the third line image data and the fourth line image data; and outputting the fifth line image data to a display unit.

In this case, the original image data is obtained by coding an image data based on a MPEG2, and the decoding step includes decoding the coded image data based on the MPEG2.

The method may further include the step of outputting the first line image data as the third line image data, when the difference between the first line image data and the second line image data is smaller than the predetermined value and when the original image data is of an interlace scanning system.

Also, the method may further include the step of always outputting the first line image data as the third line image data when the original image data is of a progressive scanning system.

Also, the method may further include the step of selectively inhibiting the output of the fifth line image data when the original image data is of the progressive scanning system. In this case, the selectively inhibiting step includes selectively inhibiting the output of the fifth line image data such that the fifth line image data for one of fields of a frame is outputted and such that the fifth line image data for the other fields of the frame is not outputted.

In order to achieve still another aspect of the present invention, a scanning system converting system for a display unit of a progressive scanning system, includes a decoding section for decoding a coded image data obtained by coding an original image data to generate a decoded image data and a control data; a field memory section for storing a previous field of the decoded image and outputting the previous field of the decoded image data for a current line as a first line image data; an interpolating section for interpolating a second line image data from the current field of the decoded image data for the current line and at least one line associated with the current line to output the second line image data; a first switching section for outputting, as a third line image data, the second image data when a difference between the first line image data and the second line image data is equal to or larger than a predetermined value and when the original image data is of an interlace scanning system; a first line memory section for outputting the current field of the decoded image data for the current line as a fourth line image data; a second switching section for alternately outputting, as a fifth line image data, the third line image data and the fourth line image data; and a transfer section for outputting the fifth line image data to the display unit.

DESCRIPTION OF THE PREFERRED EMBODIMENTS

Next, the scanning system converting apparatus of the present invention will be described with reference to the attached drawings.

Figure 1:
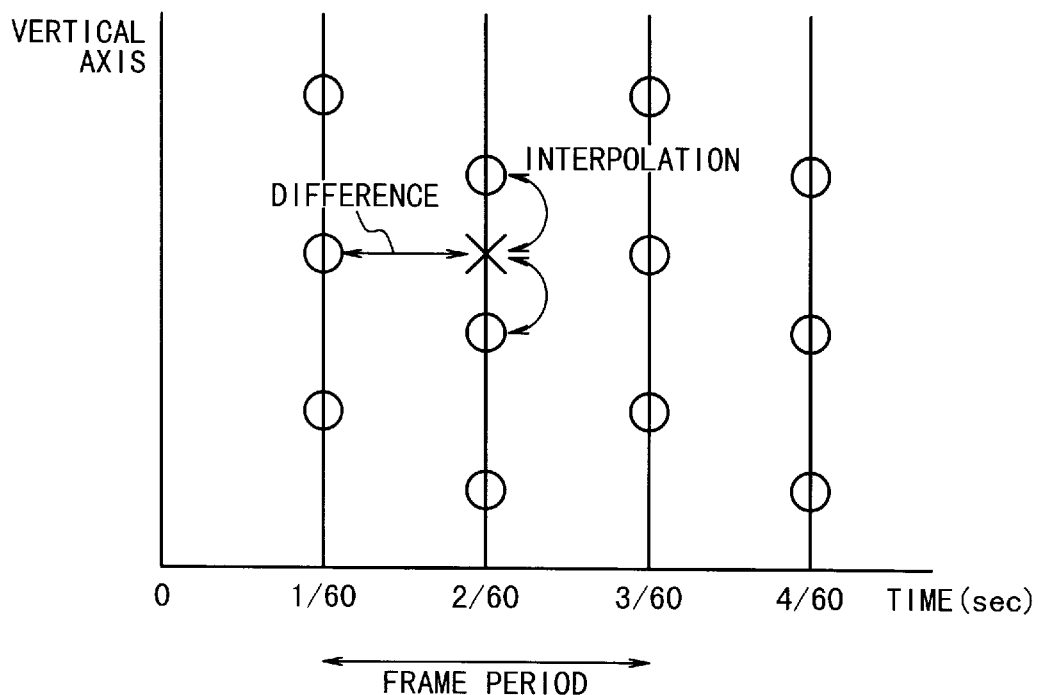
FIG. 1 is a diagram to explain a method of determining change of an image data between fields in a conventional example.
Figure 2:
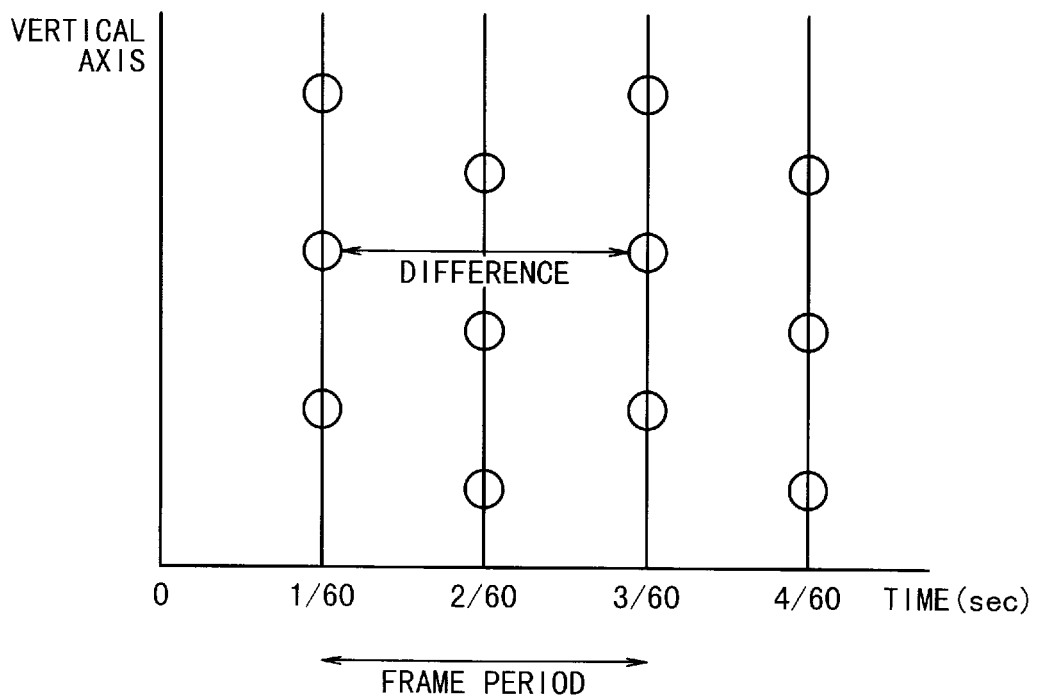
FIG. 2 is a diagram to explain another method of determining change of an image data between fields in another conventional example.
Figure 3:
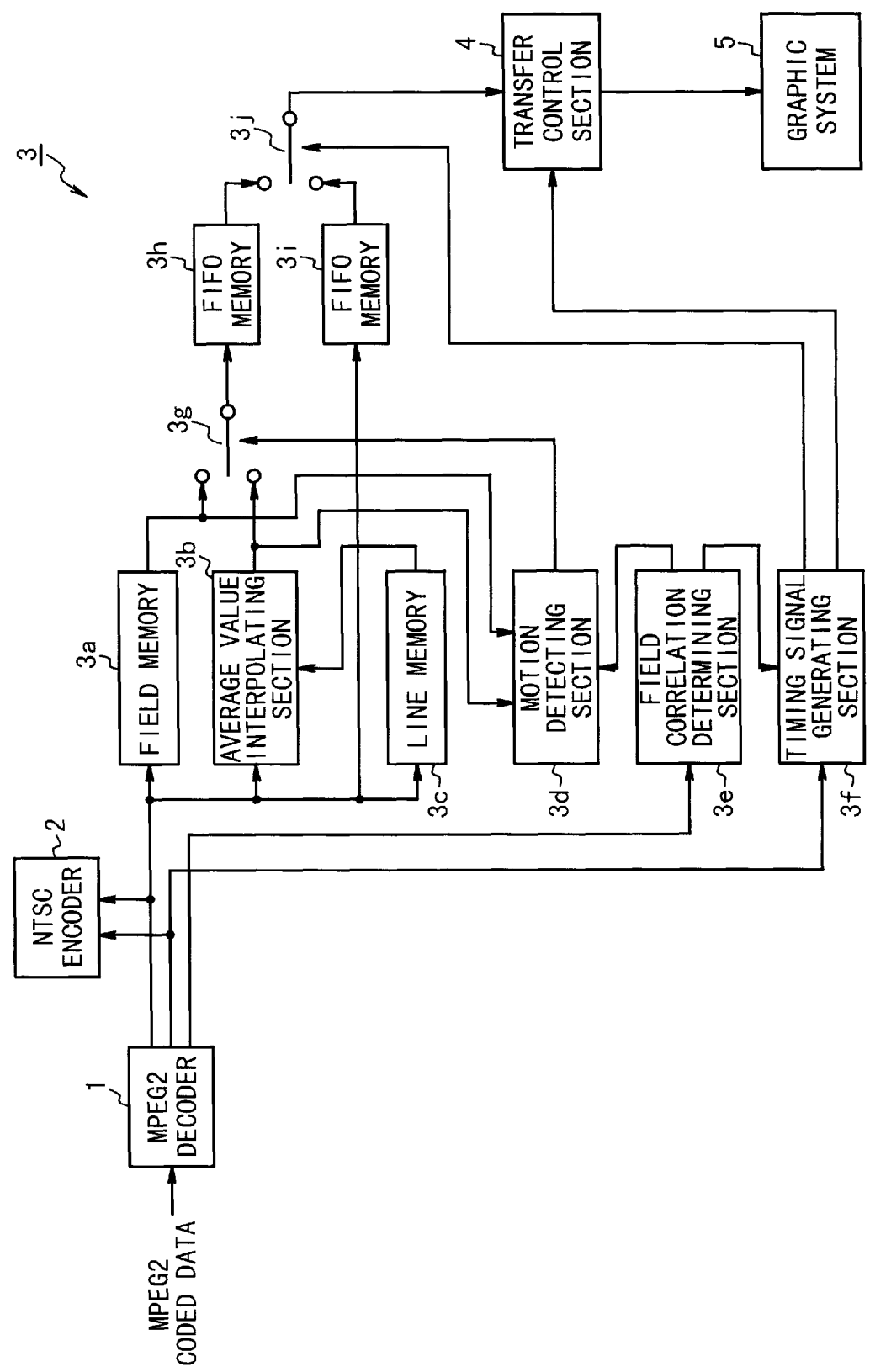
FIG. 3 is a block diagram illustrating the structure of a scanning system converting apparatus according to a first embodiment of the present invention.

FIG. 3 is a block diagram which shows the structure of the scanning system converting apparatus according to the first embodiment of this embodiment. As illustrated, the image output system is composed of an MPEG2 decoder 1, an NTSC encoder 2, a scanning system converting circuit 3, a transfer control section 4 and a graphic system 5. The scanning system converting circuit 3 is composed of a field memory 3a, an average value interpolating section 3b, a line memory 3c, a motion detecting section 3d, a field correlation determining section 3e, a timing signal generating section 3f, a switch 3g, FIFO memories 3h and 3i and a switch 3j.

The MPEG2 decoder 1 decodes an MPEG2 coded image data which has been coded in accordance with the MPEG2 and which is supplied through a communication line. Then, the MPEG2 decoder 1 outputs the decoded image data in the field frequency of the NTSC video signal of the (2:1) interlace scanning system. Also, the MPEG2 decoder 1 outputs a sync signal of the NTSC video signal.

The MPEG2 coded image data which is supplied to the MPEG2 decoder 1 is obtained by coding an image data of the interlace scanning system or an image data of the progressive scanning system. Therefore, in order to distinguish the scanning system of the image data, a signal, Progressive_sequence, is provided in a sequence extension of a sequence header in the MPEG2 coded image data. This signal is "1" when the image data of the progressive scanning system is coded into the MPEG2 coded image data, and is "0" when the image data of the interlace scanning system is coded.

Also, the image data of the progressive scanning system includes the image data of a movie film. The frame rate of the image data is 24 Hz and is different from 30 Hz of NTSC. For the purpose of the conversion of the frame rate, in the MPEG2 coded image data, a signal, repeat_first_field, is provided in the picture coding extension of the image header. When this signal is "1", the frame is repeatedly outputted so that the frame rate can be converted.

The MPEG2 decoder 1 can recognize the field having correlation in accordance with these two kinds of signals, and generates and supplies a 2-bit field correlation signal to the field correlation determining section 3e. The field correlation signal has the following meaning to each value. That is, "00": indicates that the data is obtained by decoding the MPEG2 coded image data which has been obtained by coding an image data of the interlace scanning system and the field correlation is invalid;

"01": indicates that the field is the first field of one frame of the image data obtained by decoding the MPEG2 coded image data which has been obtained by coding an image data of progressive scanning system and that the field correlation is effective;

"10": indicates that the field is the next field of one frame of the image data obtained by decoding the MPEG2 coded image data which has been obtained by coding an image data of progressive scanning system and that the field correlation is effective; and "11": indicates that the field is repeated based on a signal repeat_first_field and that the field correlation is effective.

The NTSC encoder 2 generates an NTSC video signal based on the decoded image data and the sync signal which are outputted from the MPEG2 decoder 1. The generated NTSC video signal is supplied to an NTSC TV monitor (not shown) so that a corresponding image is displayed on the NTSC TV monitor.

The scanning system converting circuit 3 converts the decoded image data which is outputted in the interlace scanning system from the MPEG2 decoder 1, into the progressive scanning system and supplies it to the transfer control section 4. Hereinafter, the structure of the scanning system converting circuit 3 will be described in detail.

The field memory 3a delays the decoded image data which is outputted from the MPEG2 decoder 1 and whose original image data is of the interlace scanning system, for one field timing and outputs to the motion detecting section 3d and the switch 3g.

The line memory 3c delays the decoded image data which is outputted from MPEG2 decoder 1, for one line timing of the NTSC interlace scanning system and outputs to the average value interpolating section 3b. It should be noted that in the effective image data in this embodiment, 1 line is composed of 720 pixels, 1 field is composed of 240 lines and 1 frame is composed of 2 fields, i.e., 480 lines.

The average value interpolating section 3b calculates an average value of a twice previous field of the image data which is outputted from the MPEG2 decoder 1 and a current field of the image data which is outputted from the line memory 3c for every pixel, and outputs to the motion detecting section 3d and the switch 3g.

The motion detecting section 3d operates in accordance with an instruction from the field correlation determining section 3e. When the field correlation determining section 3e determines that the field correlation is effective, i.e., that the original image data is of the progressive scanning system, the motion detecting section 3d issues an instruction to the switch 3g such that the switch 3g selects the image data outputted from the field memory 3a. When the field correlation determining section 3e determines that the field correlation is invalid, i.e., that the original image data is of the interlace scanning system, the motion detecting section 3d determines whether a difference between the image data which is outputted from the field memory 3a and the image data which is outputted from the average value interpolating section 3b is equal to or larger than a predetermined value. The motion detecting section 3d issues an instruction to the switch 3g such that the switch 3g selects the image data outputted from the average value interpolating section 3b, when the difference is equal to or larger than the predetermined value, and such that the switch 3g selects the image data outputted from the field memory 3a when the difference is smaller than the predetermined value.

The field correlation determining section 3e determines the field correlation signal outputted from the MPEG2 decoder 1. The field correlation determining section 3e issues an instruction to the motion detecting section 3d such that the switch 3g always outputs the image data which is outputted from the field memory 3a, when the field correlation is effective (when the field correlation signal is "01", "10" or "11"). Also, the field correlation determining section 3e issues an instruction to the timing signal generating section 3f such that the transfer control section 4 transfers, to the graphic system 5, only an effective portion of the image data which has been converted into the progressive scanning system, e.g., only the effective portion of the first one of fields of the frame of the image data. When the field correlation is invalid (when the field correlation signal is "00"), the field correlation determining section 3e does not issue any instruction to the motion detecting section 3d. Also, the field correlation determining section 3e issues an instruction to the timing signal generating section 3f such that the timing signal generating section 3f outputs an instruction to the transfer control section 4 so that the transfer control section 4 transfers all of the image data which has been converted into the progressive scanning system, to the graphic system. That is, the instruction is effective for the effective portion of each field of the frame of the image data.

The timing signal generating section 3f sends a timing signal to the switch 3j in accordance with the determining result by the field correlation determining section 3e and the sync signal which is outputted from the MPEG2 decoder 1 such that the switch 3j is always switched for every line.

The switch 3j alternately selects and outputs one of the image data which is outputted from the FIFO memory 3h and the image data which is outputted from the FIFO memory 3i based on this timing signal. Also, the timing signal generating section 3f sends to the transfer control section 4a a timing signal (hereinafter, to be referred to as an effective signal) indicating that the image data which is outputted from the switch 3j is effective, when the timing signal is in the high level.

The switch 3g selects and outputs one of the image data which is outputted from the field memory 3a and the image data which is outputted from the average value interpolating section 3b for every line or every pixel in accordance with the instruction from the motion detecting section 3d.

Each of the FIFO memories 3h and 3i is composed of the First-In First-Out memory which has a memory capacity of at least one line. One of the output signal of the field memory 3a and the output signal of the average value interpolating section 3b which is selectively outputted by the switching of the switch 3g is written in the FIFO memory 3h. The decoded image data which is outputted from the MPEG2 decoder 1 is written in the FIFO memory 3i.

The transfer control section 4 has a buffer memory which stores the image data outputted from the switch 3j temporarily. Also, the transfer control section 4 supplies the effective portion of the image data which has been stored in the buffer memory to the graphic system 5 at the frame rate of 60 frames per one second, based on the signal which indicates the effective portion which is supplied from the timing signal generating section 3f.

The graphic system 5 has a frame memory for storing the effective portion of the image data which has been transferred from the transfer control section 4. Also, the graphic system 5 displays an image on the monitor in the progressive scanning system. In this case, the graphic system displays the image data which is transferred from the transfer control section 4. However, when no image data is transferred from the transfer control section 4, the graphic system 5 displays the previous field or frame of the image data.

Next, an operation of the scanning system converting apparatus in the first embodiment of the present will be described.

In the scanning system converting apparatus of this embodiment, an operation in the case where the decoded image data is converted by the scanning system converting circuit 3 will be described. The operation of scanning system converting circuit 3 is different depending upon whether the MPEG2 coded image data is obtained by coding the image data of the progressive scanning system or by coding from the image data of the interlace scanning system. Hereinafter, an operation in each case will be described.

I. In case of the image data of the progressive scanning system

The MPEG2 decoder 1 receives the MPEG2 coded image data having Progressive_Sequence of "1". Therefore, the MPEG2 decoder 1 decodes the received MPEG2 coded image data to sequentially output as the image data of the interlace scanning system. At the same time, the MPEG2 decoder 1 supplies a sync signal to the timing signal generating section 3f, and supplies, to the field correlation determining section 3e, the field correlation signal which takes either of "01", "10" or "11" value in accordance with the field.

An instruction is sent from the field correlation determining section 3e to the motion detecting section 3d in response to such a value of the field correlation signal with such that the switch 3g selects the image data outputted from the field memory 3a. By this, the operation of the motion detecting section 3d is stopped and the switch 3g is switched to always output the image data which has been outputted from the field memory 3a.

Paying attention to the image data which has been outputted from the MPEG2 decoder 1, the image data which is outputted from the field memory 3a is delayed for one field time from the image data which has been outputted from the MPEG2 decoder 1. That is, when the image data for the first field of one frame is outputted from the field memory 3a and is written in the FIFO memory 3h, the image data for the following field is outputted from the MPEG2 decoder 1 and is written in the FIFO memory 3i.

On the other hand, the timing signal to switch the switch 3j is supplied from the timing signal generating section 3f based on the sync signal which has been supplied from the MPEG2 decoder 1. In response to this timing signal, the switch 3j is switched in response to the timing signal such that the image data outputted from the FIFO memory 3h and the image data outputted from the FIFO memory 3i are alternately outputted for every line. By this, the image data which is outputted from the switch 3j is the image data of the progressive scanning system having no skip of any line. The image data of this progressive scanning system is supplied to the transfer control section 4 and is temporarily stored in a buffer memory of the transfer control section 4.

Figure 4:
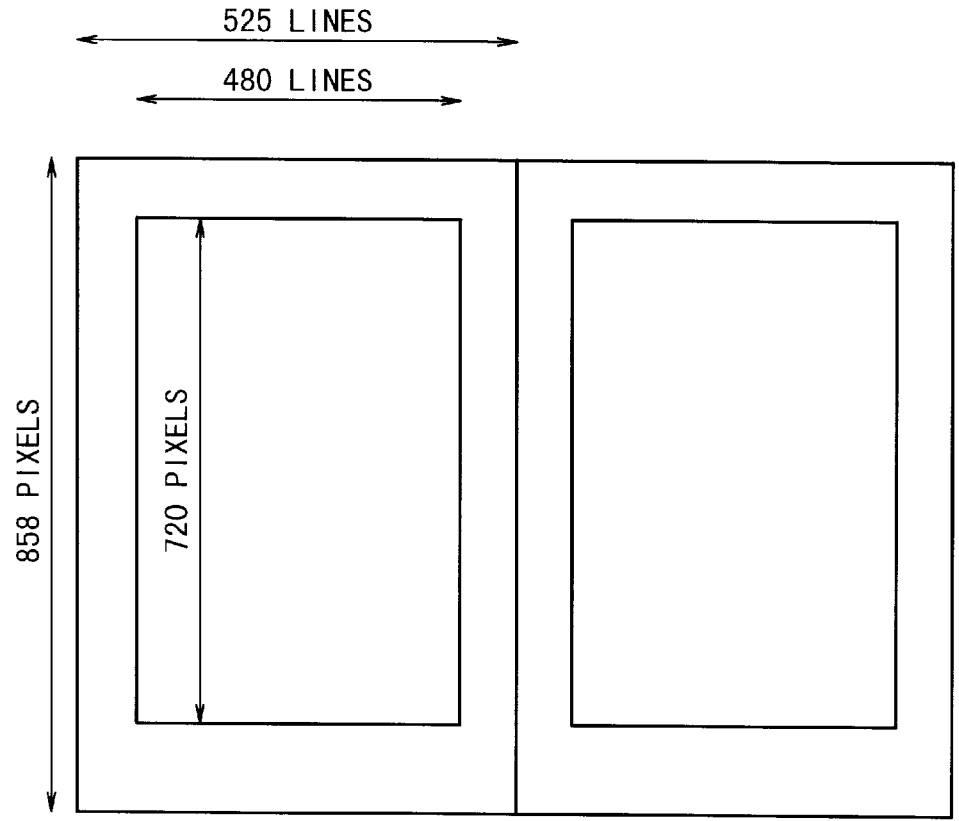
FIG. 4A is a timing chart illustrating an effective signal which is sent from a timing signal generating section to a transfer control section, when an original image data is of a progressive scanning system.
FIG. 4B is a diagram illustrating fields of the image data of the progressive scanning system which is outputted from a transfer control section, when the original image data is of the progressive scanning system.

Also, in the field correlation determining section 3e, when it is determined that the field correlation signal value is "10", an instruction is sent to the timing signal generating section 3f so as to send an effective indication signal with the high level to the transfer control section 4. As shown in FIGS. 4A and 4B, based on this instruction, the effective indication signal with the high level is sent from the timing signal generating section 3f to the transfer control section 4. The transfer control section 4 transfers the effective portion of the image data which is stored newly in the buffer memory to the graphic system 5. Thus, the image data which has been transferred from the transfer control section 4 is displayed on the monitor of the graphic system 5.

On the other hand, in the field correlation determining section 3e, when it is determined that the field correlation signal value is "01" or "11", an instruction is not sent to the timing signal generating section 3f. Therefore, as shown in FIGS. 4A and 4B, the effective indication signal which is sent from the timing signal generating section 3f to the transfer control section 4 becomes the low level, so that the transfer control section 4 does not transfer no image data to the graphic system 5. As a result, in the graphic system 5, the image data which has been transferred last is displayed, i.e., the same image is repetitively displayed.

Figure 5:
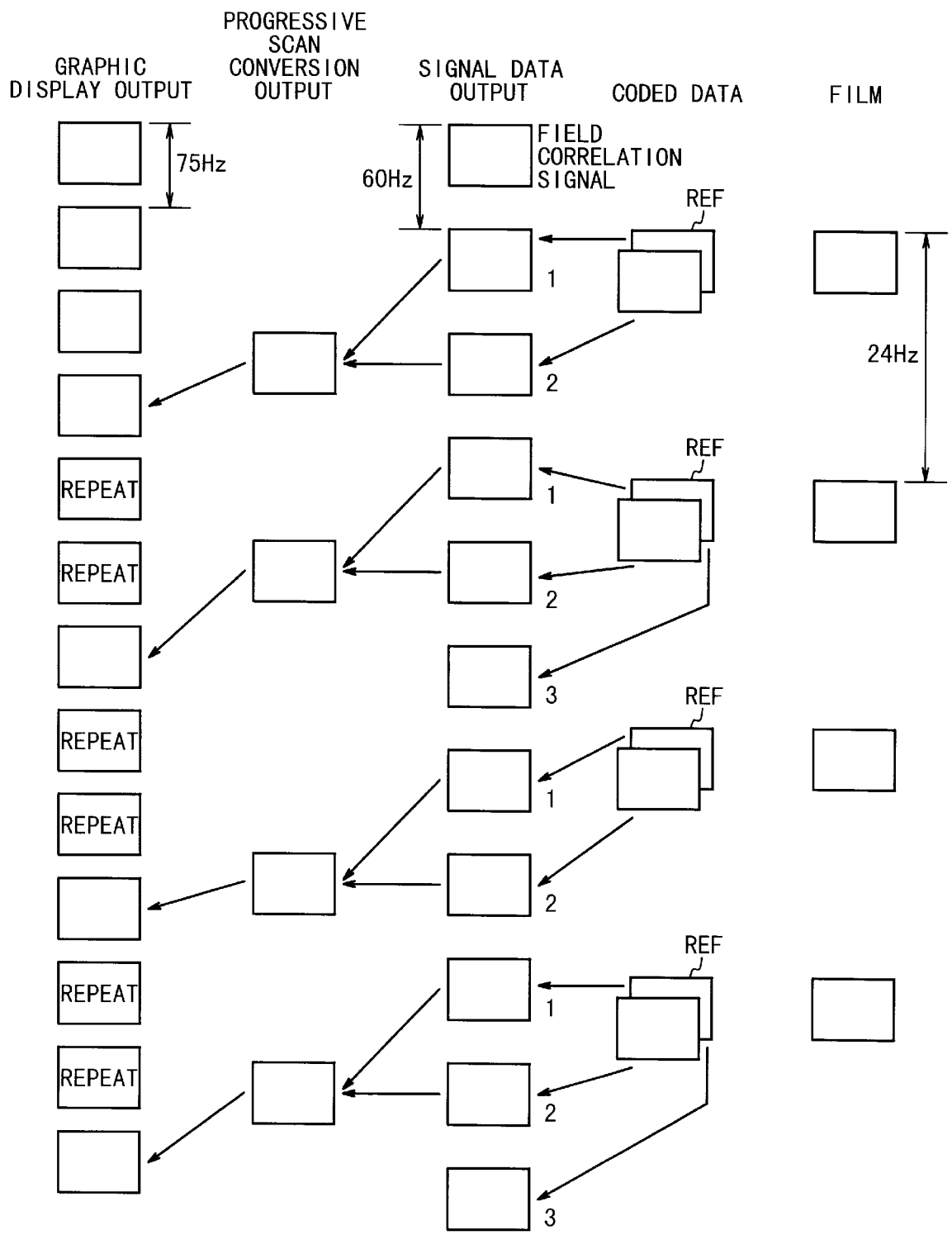
FIG. 5 is a diagram to explain the timing when an MPEG2 coded image data is derived from the image data of a movie film.

The timings from the decoding of the MPEG2 coded image data to the display which are described above are shown in FIG. 5, taking as an example the case that the image data before coding is the movie film which has the frame rate of 24 Hz. In this example, an image data of the progressive scanning system is obtained from one field of the movie film with the frame rate of 24 Hz through the scanning system conversion. The image data is supplied to the graphic system 5 with the frame rate 75 Hz. Therefore, the same image data is repetitively displayed to eliminate the frame rate difference.

II. In case of the image data of the interlace scanning system

The MPEG2 decoder 1 receives the MPEG2 coded image data with Progressive_Sequence of "1". At that time, the MPEG2 decoder 1 decodes the received MPEG2 coded image data to sequentially output in the interlace scanning system. Also, the MPEG2 decoder 1 supplies the sync signal to the timing signal generating section 3f, and supplies the field correlation signal of the value of "00" to the field correlation determining section 3e.

From the line memory 3c, the image data which has been outputted from the MPEG2 decoder 1 is delayed for one line time and outputted to the average value interpolating section 3b. An average of the image data which is outputted from the line memory 3c and the image data which is outputted from the MPEG2 decoder 1 is calculated by the average value interpolating section 3b, and a signal is generated to interpolate the line which is skipped in the interlace scanning system.

On the other hand, since the field correlation signal is "00" in this case, an instruction is sent from the field correlation determining section 3e to the motion detecting section 3d. At this time, the motion detecting section 3d compare the image data which is outputted from the field memory 3a and the image data which is outputted from the average value interpolating section 3b, in response to the instruction. As the comparing result, when it is determined that a difference between both of the image data is larger than a predetermined value, that is, when it is determined that there is not any movement between images, the motion detecting section 3d outputs an instruction to the switch 3g. As a result, the switch 3g is switched in response to the instruction from the motion detecting section 3d in such a manner that the image data outputted from the field memory 3a is selected. When it is determined that the difference between both of the image data is larger than the predetermined value, that is, when it is determined that there is any movement in the image, the motion detecting section 3d outputs an instruction to the switch 3g. The switch 3g is switched in response to the instruction from the motion detecting section 3d in such a manner that the average of the image data outputted from the average value interpolating section 3b is selected. Thus, the selected image data is written in the FIFO memory 3h.

In this case, the writing of the image data which is outputted from the MPEG2 decoder 1 in the FIFO memory 3i, the generation of the timing signal by the timing signal generating section 3f, the switching by the switch 3j, the writing of the image data which is outputted from the switch 3j into the buffer memory of the transfer control section 4 are the same as those in the case that the image data before coding is the image data of the progressive scanning system.

Figure 6:
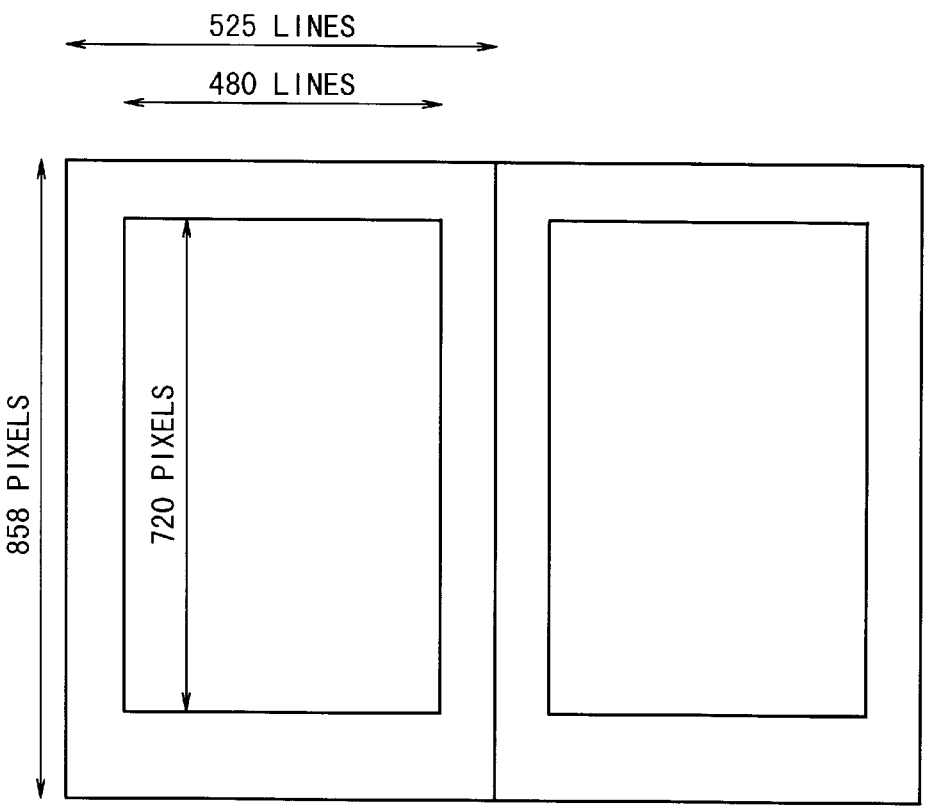
FIG. 6A is a timing chart illustrating the effective signal which is sent from the timing signal generating section to the transfer control section, when the original image data is of an interlace scanning system.
FIG. 6B is a diagram illustrating fields of the image data of an interlace scanning system which is outputted from a transfer control section when the original image data is of an interlace scanning system.

Also, when it is determined in the field correlation determining section 3e that the field correlation signal value is "00", an instruction is sent to the timing signal generating section 3f such that the effective indication signal with the high level is sent to the transfer control section 4. As shown in FIGS. 6A and 6B, based on this instruction, the effective indication signal with the high level is sent from the timing signal generating section 3f to the transfer control section 4.

The transfer control section 4 transfers to the graphic system 5, the effective portion of the image data which is stored newly in the buffer memory therein. Then, the image data which is transferred from the transfer control section 4 is displayed on the monitor of the graphic system 5.

Figure 7:
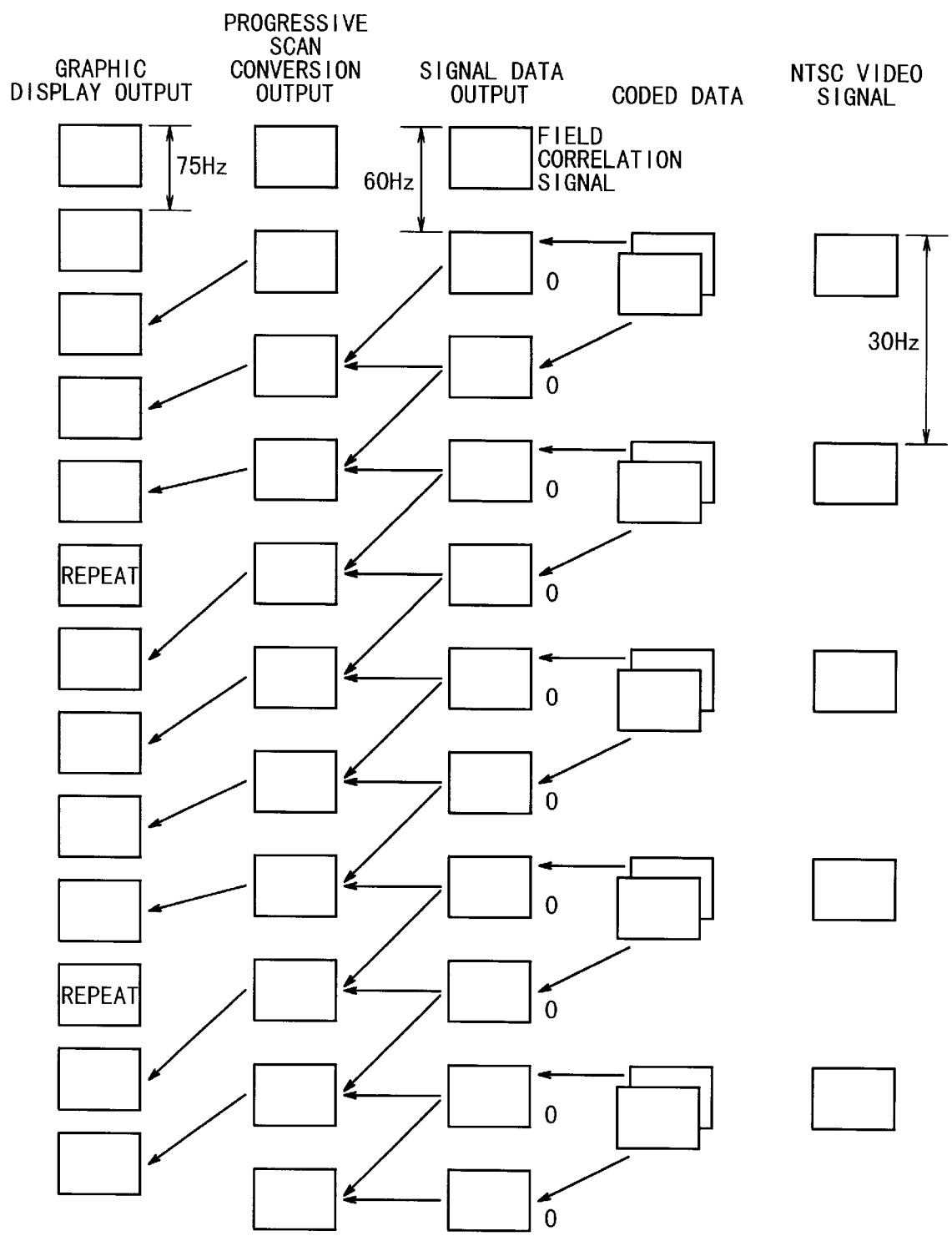
FIG. 7 is a diagram to explain the timing when the MPEG2 coded image data is derived from the video signal of the NTSC system.
Figure 8:
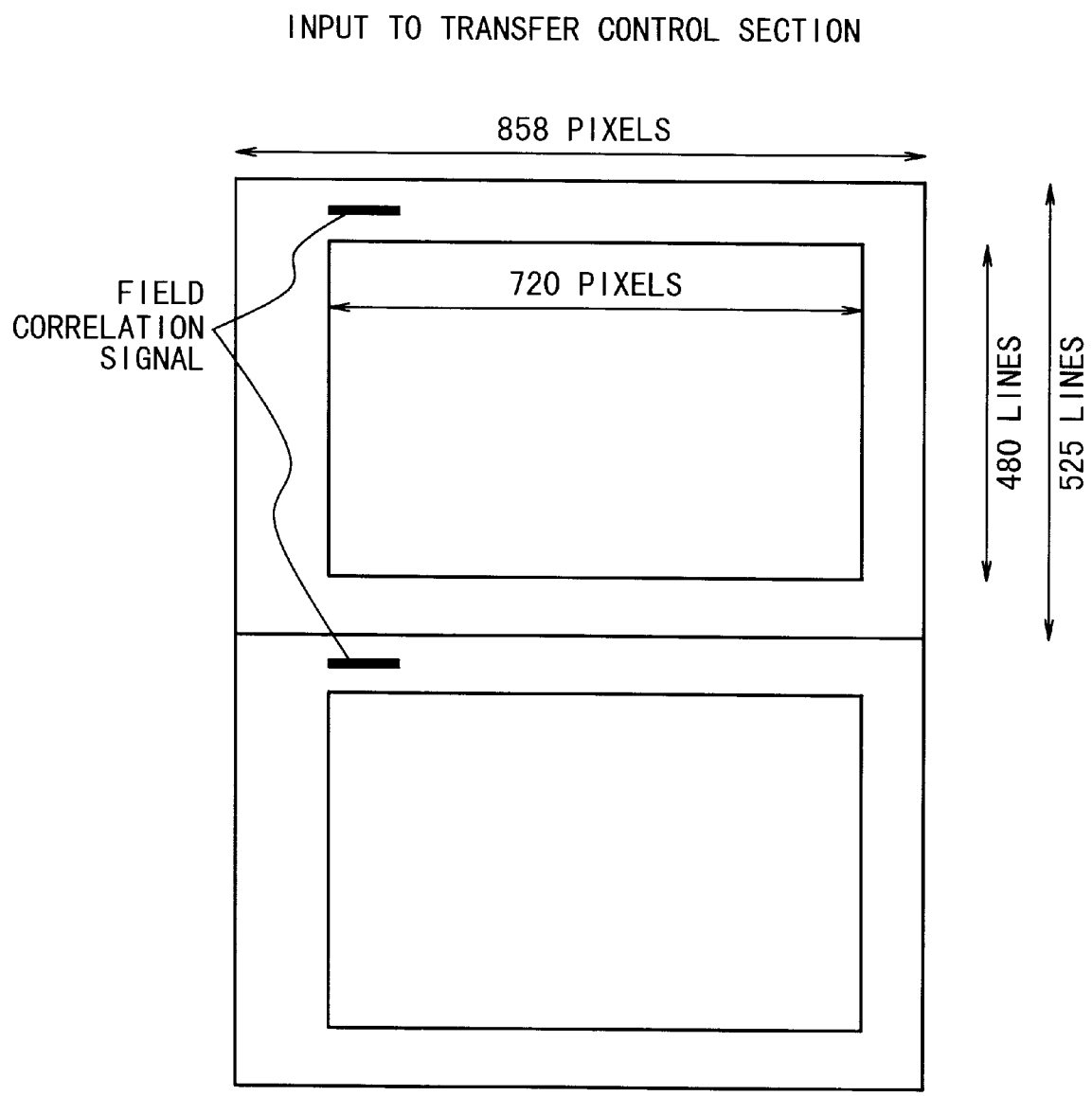
FIG. 8 is a diagram when a decoded data and a correlation signal are transferred in a time division multiplexing manner in the scanning system converting apparatus according to a second embodiment of the present invention.

The timings from the decoding of the MPEG2 coded image data to the display on the graphic system which are described above are shown in FIG. 7, taking as an example the case that the image data before coding is the NTSC video signal which has the frame rate of 30 Hz. In this example, each field of each frame of the image data of the progressive scanning system after the scanning system conversion is transferred to the graphic system 5. However, for the difference between the frame rates, the same image are repetitively displayed sometimes to cancel the difference.

As described above, in the scanning system converting apparatus of this embodiment, when the MPEG2 coded image data is obtained by coding the image data of the progressive scanning system, any interpolation signal is never used for the purpose of the conversion into the progressive scanning system. Therefore, the image data which is outputted from the switch 3j and which is converted into the progressive scanning system is substantively the same as the image data before coding, so that the image quality is not degraded. Moreover, the image data of the progressive scanning system which is outputted from the switch 3j is the same as the image data before coding in the frame rate, and a data amount of the image data which is transferred from the transfer control section 4 is a few.

Also, because the image data which is outputted from the MPEG2 decoder 1 is of the NTSC interlace scanning system, the image data is possible to be displayed on the NTSC TV monitor and on the monitor of the graphic system through the scanning system converting circuit 3 and the transfer control section 4.

Also, when the image data before coding is of the interlace scanning system, any problem never occurs in the conversion into the progressive scanning system, because the interpolation signal can be used.

In above-mentioned embodiment, the MPEG2 decoder 1 outputs the image data of the NTSC 2:1 interlace scanning system. However, it is possible to output the image data in another interlace scanning system, e.g., n:1 (n is an integer equal to or more than 3) interlace scanning system. In this case, it is sufficient that a plurality of field memories which have the delayed field times different from each other are provided and the FIFO memories which correspond to the plurality of field memories are provided. Also, the average value interpolating section 3b is sufficient to calculate an average weighted in accordance with the vertical distance determined in order of the fields.

Figure 9:
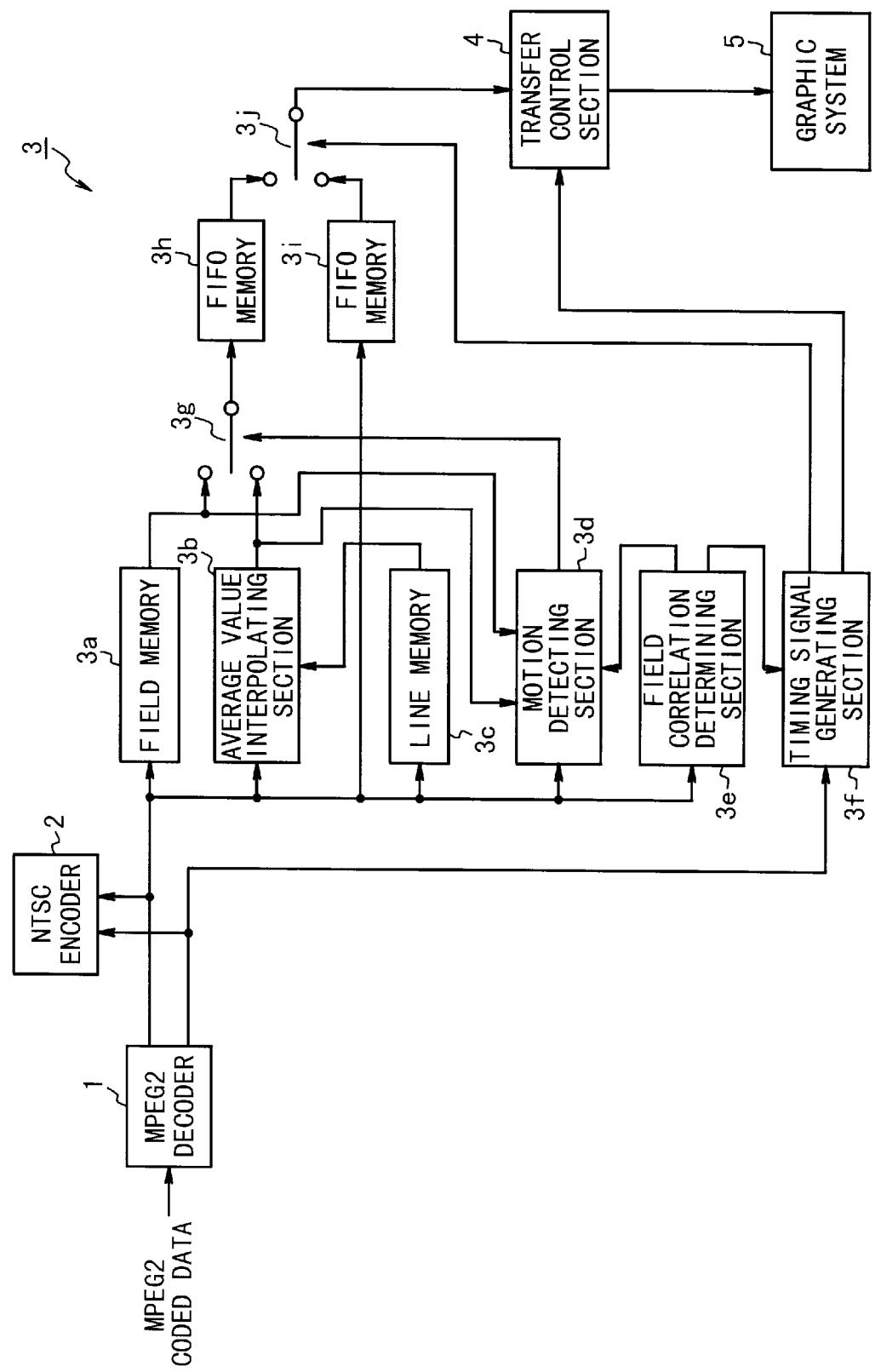
FIG. 9 is a block diagram illustrating the structure of the scanning system converting apparatus according to the second embodiment of the present invention.
Figure 10:
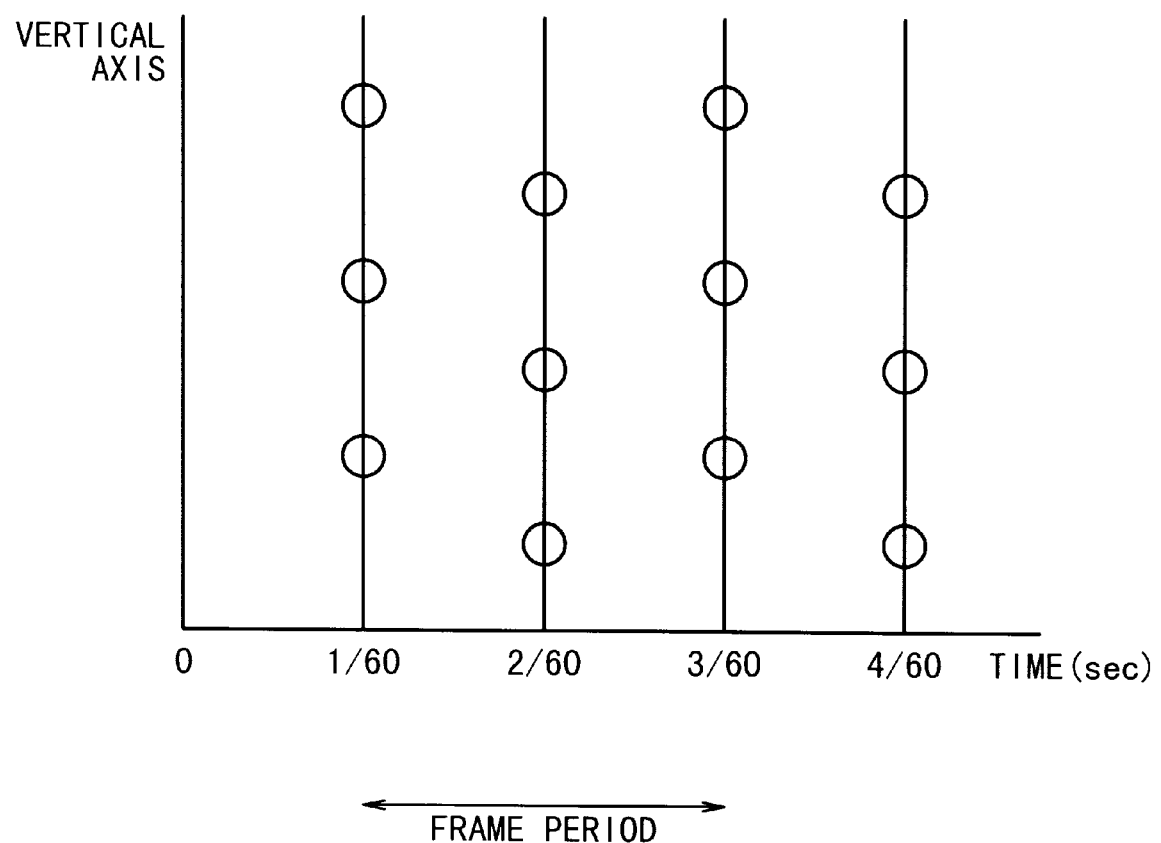
FIG. 10 is a diagram illustrating the relation of frame period and vertical axis in the image data of the interlace scanning system.

In the above-mentioned embodiment, the decoded data and the field correlation signal are outputted onto the different signal lines from the MPEG2 decoder 1. However, as shown in the schematic diagram of FIG. 10 and the block diagram of FIG. 9, they may be outputted on the identical signal line in a time division multiplexing manner.

In above-mentioned embodiment, the image data which is coded in accordance with MPEG2 is described as the example. However, the present invention is not limited to this. The present invention is possible to apply to all cases in which when the image data of the interlace scanning system or of the progressive scanning system has been coded by a coding system other than MPEG2 and is decoded and outputted in the interlace scanning system, the image data is converted into the progressive scanning system.

As described above, according to the present invention, when the image data before coding is of the image of the progressive scanning system, the image data after the scan conversion is substantively the same as the image data before coding so that the image quality is not degraded.

What is claimed is:

1. A scanning system converting system for a display unit of a progressive scanning system comprising:

a decoder for decoding a coded image data to output a decoded image data and a control data, wherein said coded image data is obtained by coding a first image data, and said control data indicates whether a scanning system of said first image data is a progressive scanning system or an interlace scanning system and whether fields of said first image data are correlated;

a transfer section for transferring a second image data to said display unit in response to an effective indication signal;

a control section for selectively generating said effective indication signal and first and second control signals based on said control data supplied from said decoder to supply said effective indication signal to said transfer section; and a converting section for selectively outputting, as said second image data, one of a current field of said decoded image data, a previous field of said decoded image data and an interpolated image data for every line based on said first and second control signals supplied from said control section, said interpolated image data being interpolated from said current field of said decoded image data.

2. A scanning system converting system according to claim 1, wherein said control section outputs said effective indication signal such that said effective indication signal is always active when said first image data is of an interlace scanning system, and such that said effective indication signal is active only for a first one of fields of a frame of said second image data when said first image data is of a progressive scanning system.

3. A scanning system converting system according to claim 1, wherein said coded image data is obtained by coding said first image data based on a MPEG2, and said decoder decodes said coded image data based on the MPEG2.

4. A scanning system converting system according to claim 1, wherein said converting section includes:

a field memory for storing said previous field of said decoded image data outputted from said decoder to output said previous field of said decoded image data for every line as a first line image data;

a first line memory for storing said current field of said decoded image data outputted from said decoder for every line to output said current field of said decoded image data for every line as a second line image data;

a first switch for selecting one of said first line image data and said second line image data in response to a first switching signal to output the selected image data as a third line image data;

an interpolating section for generating said interpolated image data for every line from said current field of said decoded image data and said second line image data outputted from said first line memory to output a third line image data;

a detecting section for detecting a difference between said first line image data and said third line image data in response to said first control signal to output said first switching signal to said first switch based on the detecting result;

a third line memory for storing said third line image data to output as a fourth line image data;

a fourth line memory for storing said current field of said decoded image data outputted from said decoder for every line to output as a fifth line image data; and a second switch for selecting one of said fourth line image data and said fifth line image data in response to said second control signal as a second switching signal to output the selected image data as said second image data.

5. A scanning system converting system according to claim 4, wherein said control section generates said second control signal as said second switching signal such that said fourth line image data and said fifth line image data are alternately outputted to said transfer section as said second image data.

6. A scanning system converting system according to claim 4, wherein said control section generates said first control signal such that said first line image data is always selected when said first image data is of a progressive scanning system.

7. A scanning system converting system according to claim 4, wherein said detecting section outputs said first switching signal to said first switch in response to said first control signal such that said first line image data is always selected, when said first image data is of a progressive scanning system.

8. A scanning system converting system according to claim 7, wherein said detecting section outputs said first switching signal to said first switch based on the detecting result in response to said first control signal such that one of said first line image data and said second line image data is selected, when said first image data is of an interlace scanning system.

9. A scanning system converting system according to claim 8, wherein said detecting section outputs said first switching signal to said first switch in response to said first control signal such that said first line image data is selected, when said first image data is of an interlace scanning system and when the difference is smaller than a predetermined value, and such that said second line image data is selected, when said first image data is of an interlace scanning system and when the difference is equal to or larger than the predetermined value.

10. A method of converting a scanning system of an image data signal into a progressive scanning system, comprising the steps of:

decoding a coded image data obtained by coding an original image data to generate a decoded image data and a control data;

outputting a previous field of the decoded image data for a current line as a first line image data;

outputting, as a second line image data, an interpolated image data obtained from said current field of said decoded image data for said current line and at least one line associated with said current line;

outputting, as a third line image data, said second image data when a difference between said first line image data and said second line image data is equal to or larger than a predetermined value and when said original image data is of an interlace scanning system;

outputting said current field of the decoded image data for said current line as a fourth line image data;

alternately outputting, as a fifth line image data, said third line image data and said fourth line image data; and outputting said fifth line image data to a display unit.

11. A method according to claim 10, wherein said original image data is obtained by coding an image data based on a MPEG2, and said decoding step includes decoding said coded image data based on the MPEG2.

12. A method according to claim 10, further comprising the step of outputting said first line image data as said third line image data, when the difference between said first line image data and said second line image data is smaller than the predetermined value and when said original image data is of an interlace scanning system.

13. A method according to claim 10, further comprising the step of always outputting said first line image data as said third line image data when said original image data is of a progressive scanning system.

14. A method according to claim 13, further comprising the step of selectively inhibiting said output of said fifth line image data when said original image data is of the progressive scanning system.

15. A method according to claim 14, wherein said selectively inhibiting step includes selectively inhibiting said output of said fifth line image data such that said fifth line image data for one of fields of a frame is outputted and such that said fifth line image data for the other fields of the frame is not outputted.

16. A scanning system converting system for a display unit of a progressive scanning system, comprising:

decoding means for decoding a coded image data obtained by coding an original image data to generate a decoded image data and a control data;

field memory means for storing a previous field of the decoded image and outputting said previous field of said decoded image data for a current line as a first line image data;

interpolating means for interpolating a second line image data from said current field of said decoded image data for said current line and at least one line associated with said current line to output said second line image data;

first switching means for outputting, as a third line image data, said second image data when a difference between said first line image data and said second line image data is equal to or larger than a predetermined value and when said original image data is of an interlace scanning system;

first line memory means for outputting said current field of said decoded image data for said current line as a fourth line image data;

second switching means for alternately outputting, as a fifth line image data, said third line image data and said fourth line image data; and transfer means for outputting said fifth line image data to said display unit.

17. A scanning system converting system according to claim 16, wherein said original image data is obtained by coding an image data based on a MPEG2, and said decoding step includes decoding said coded image data based on the MPEG2.

18. A scanning system converting system according to claim 16, wherein said first switching means outputs said first line image data supplied from said field memory means as said third line image data, when the difference between said first line image data and said second line image data is smaller than the predetermined value and when said original image data is of an interlace scanning system.

19. A scanning system converting system according to claim 16, wherein said first switching means always outputs said first line image data as said third line image data when said original image data is of a progressive scanning system.

20. A scanning system converting system according to claim 19, further comprising control means for selectively inhibiting said transfer means from outputting said fifth line image data when said original image data is of the progressive scanning system.

21. A scanning system converting system according to claim 20, wherein said control means controls said transfer means such that said transfer means outputs said fifth line image data for one of fields of a frame and such that said transfer means does not output said fifth line image data for the other fields of the frame.

* * * * *